Patented June 10, 1924.

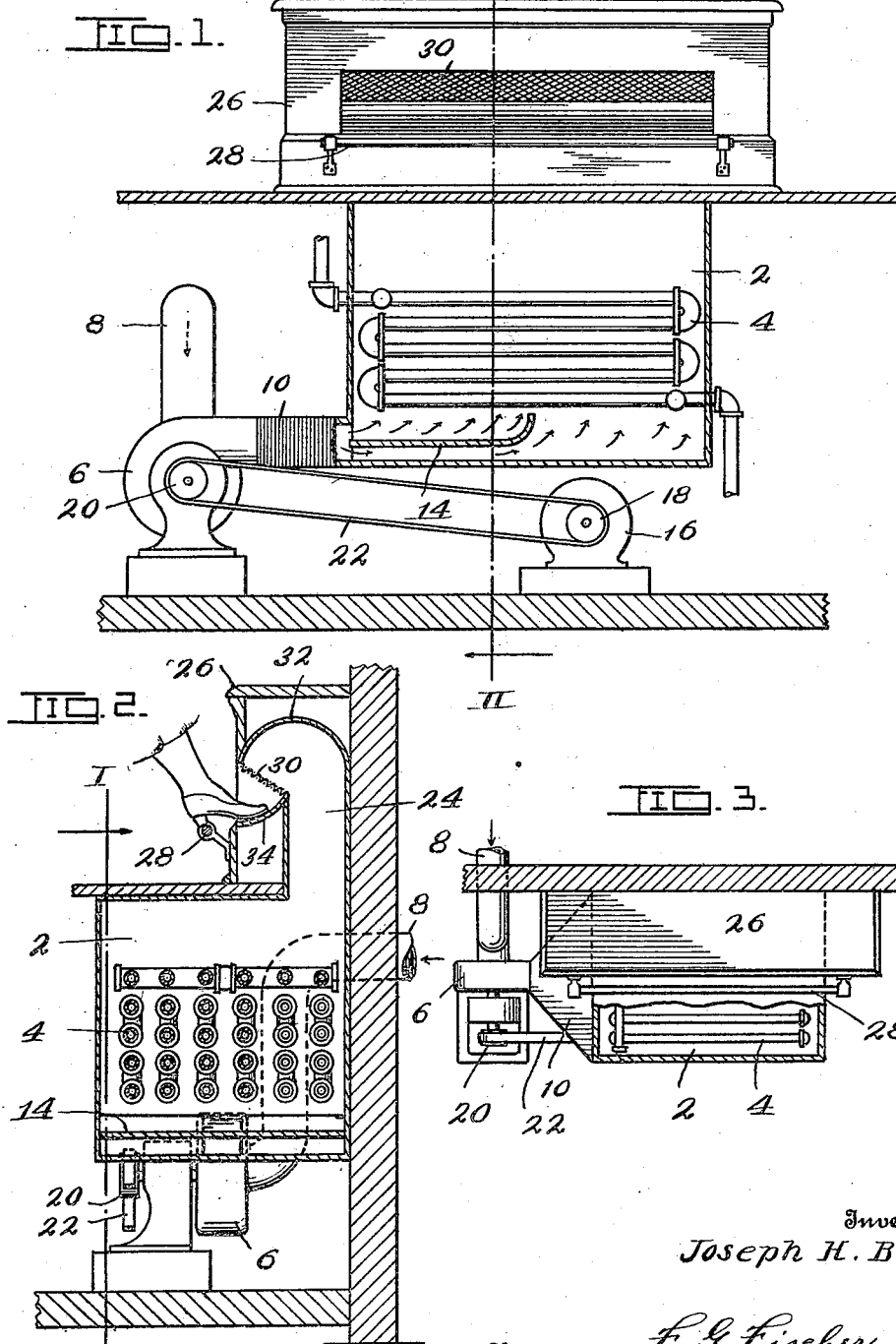

1,497,062

UNITED STATES PATENT OFFICE.

JOSEPH H. BRADY, OF KANSAS CITY, MISSOURI.

FOOT WARMER.

Application filed September 23, 1922. Serial No. 590,182.

*To all whom it may concern:*

Be it known that I, JOSEPH H. BRADY, a citizen of the United States, residing at Kansas City, in the county of Jackson and State of Missouri, have invented certain new and useful Improvements in Foot Warmers, of which the following is a specification.

My invention relates to foot warmers and my object is to provide an efficient apparatus of this character which may be used to advantage in dwellings, school houses and other public buildings.

In carrying out the invention, I provide apparatus for heating air which is discharged from a register provided with a foot-rest over and around which the heated air flows, so that the feet may be warmed by the air while resting them upon said foot-rest. The register is preferably in the form of a box-seat so that it may be utilized as such when desired.

Other features will hereinafter appear, and in order that the invention may be fully understood, reference will now be had to the accompanying drawing, in which:

Fig. 1 is a front elevation, partly in section on line I—I of Fig. 2, of the apparatus.

Fig. 2 is a vertical section on line II—II of Fig. 1.

Fig. 3 is a reduced plan view partly in section.

In carrying out the invention I employ a heating chamber 2, containing coils 4 which may be heated by any suitable agent such as steam, hot water, etc.

Air is supplied to the chamber 2 by suitable means such as a blower 6 having an inlet pipe 8 and a discharge pipe 10, which latter flares at its discharge end where it communicates with the lower portion of the chamber 2 for the purpose of distributing the air uniformly throughout said chamber and over the coils 4. The flaring portion of the discharge pipe 10 is assisted in distributing the air uniformly throughout the chamber 2 and over the coils 4 by means of a spreader 14, which extends from the discharge pipe 10 to the intermediate portion of the chamber 2 as shown by Fig. 1, to direct a portion of the air to the opposite side of the chamber 2 from that to which the discharge pipe 10 is connected. The air inlet pipe 8 may be arranged to take in air from the building in which the apparatus is located or it may be arranged to take in the outer atmosphere, or both, as preferred.

The blower 6 is driven by a suitable motor 16 through the intermediacy of pulleys 18 and 20 and a belt 22.

The upper portion of the heating chamber 2 communicates with a passageway 24 leading upwardly to a register 26 arranged, preferably, in the form of a box-seat as shown. Said register 26 is provided at its front portion with a foot-rail 28 arranged beneath a screened opening 30 through which the warm air is discharged, said air being deflected downwardly over the foot-rail 8 by the curved upper portion 32 of the passageway 24. By placing a screen over the opening 30 paper and other trash is excluded from passing therethrough into the heating chamber 2.

A plate 34 arranged beneath the opening 30 coacts with the foot-rail 28 in supporting the feet.

In practice the blower 6 and the heating chamber 2 are, preferably, arranged in the basement of a building, while the register 26 is arranged on the floor above. The register 26 is supplied with a constant stream of heated air which is warmed by the coils 4 as the air is received from the blower 6.

From the foregoing description it will be understood that I have provided a foot warmer embodying the advantages above pointed out, and while I have shown the preferred construction, combination and arrangement of parts, I reserve the right to make such changes as properly fall within the spirit and scope of the claim.

Having thus described my invention, what I claim and desire to secure by Letters Patent, is:

A register consisting of a box-seat having a discharge opening in its front wall for the passage of heated air, a foot-rest fixed to said box-seat at a point beneath the discharge opening, a passageway in the box-seat leading from a supply of heated air and having a curved upper wall for directing the heated air downwardly through the discharge opening and over said foot-rest, and a foot-plate arranged within the box-seat at the bottom of the discharge opening to coact with the foot-rest, for the purpose described.

In testimony whereof I affix my signature, in the presence of two witnesses.

JOSEPH H. BRADY.

Witnesses:
L. J. FISCHER,
F. C. FISCHER.